United States Patent [19]

Miyahira et al.

[11] Patent Number: 4,882,770

[45] Date of Patent: Nov. 21, 1989

[54] WIRELESS OPTICAL COMMUNICATION SYSTEM

[75] Inventors: Ronald T. Miyahira, Honolulu, Hi.; Kenneth Fasen, San Diego, Calif.

[73] Assignee: H. M. Electronics, Inc., San Diego, Calif.

[21] Appl. No.: 132,345

[22] Filed: Dec. 14, 1987

[51] Int. Cl.⁴ .............................................. H04B 9/00
[52] U.S. Cl. ....................................... 455/603; 370/3; 370/4; 455/607; 455/617
[58] Field of Search ................ 455/600, 603, 606, 607, 455/609, 611, 613, 617; 370/3, 4

[56] References Cited

U.S. PATENT DOCUMENTS

| | | | |
|---|---|---|---|
| 2,153,709 | 4/1939 | Bournisien | 455/606 |
| 4,101,878 | 7/1978 | Shimizu | 340/310 A |
| 4,262,362 | 4/1981 | Kiernan et al. | 455/612 |
| 4,330,204 | 5/1982 | Dye | 455/607 |
| 4,393,515 | 7/1983 | de Neumann | |
| 4,402,090 | 8/1983 | Gfeller et al. | 370/4 |
| 4,543,665 | 9/1985 | Sotelo | 455/603 |
| 4,682,323 | 7/1987 | Corfield et al. | |

FOREIGN PATENT DOCUMENTS

| | | | |
|---|---|---|---|
| 0236180 | 9/1987 | European Pat. Off. | 370/4 |
| 2823931 | 12/1979 | Fed. Rep. of Germany | 455/602 |
| 0096893 | 5/1986 | Japan | 370/3 |
| 2079088 | 1/1982 | United Kingdom | 455/607 |

*Primary Examiner*—Robert L. Griffin
*Assistant Examiner*—L. Van Beek
*Attorney, Agent, or Firm*—Bernard L. Kleinke

[57] ABSTRACT

A wireless optical short-range communication system adapted for use as an intercom system. The system can be used in fast food restaurants and similar commercial institutions. The communication system includes a base station to interconnect via optical communication a group of substantially similar physically spaced-apart, remote units. Each one of the remote units and the base units includes an optical emitter to transmit an optical message-carrying beam to the base station, and an optical receptor to receive an optical message-carrying beam from the base station. The base station includes a receptor for receiving the optical beam transmitted by the optical emitters of all of the remote units, and an optical emitter to relay the received optical beam to the optical receptors of all the remote units. The base station includes a clock arrangement for synchronizing the operation of the system 10 in a time division multiplexing carrier arrangement, by providing individual discrete time slots for the transmission of the signals from the remote units to the base unit, and for the transmission of the signals from the base unit to the remote units. In this regard, the base station and each one of the remote units include an oscillator to modulate the audio frequency on a predetermined subcarrier frequency, and another oscillator to modulate the subcarrier frequency on a predetermined optical infrared carrier frequency. This method of multiplexing a duplex communication system on a single carrier frequency can also be used in a radio frequency system as well as in an optical system.

30 Claims, 2 Drawing Sheets

WIRELESS OPTICAL COMMUNICATION SYSTEM

TECHNICAL FIELD

The present invention relates in general to a communication system, and it more particularly relates to a wireless optical communication system for short range use, such as for use in fast food restaurants, or such other commercial institutions.

BACKGROUND ART

The art of transmitting and receiving intelligence by using short-range two-way radio communication systems is well known in some industries, and has, for example, gained wide-spread recognition by the fast food restaurant industry. In fast food restaurants, or such other similar commercial establishments, orders are generally placed by the customers, either in person, or at a remote location. The remote customer location is provided with a microphone and a speaker to establish a two-way communication link with the operating personnel executing the order. The microphone and speaker are usually connected by a metallic line to a base station, which receives and transmits the customer's orders over a radio frequency link, to several remote stations or units, for execution.

When, on the other hand, the customer places the order in person, an operator on the restaurant premises transmits the order to the base station and to the several remote stations for execution. Thus, whether the orders are placed in person, or at the remote customer location, they are communicated to the base station, which in turn relays such orders to the remote stations.

Each one of the remote stations generally includes two circuit activating buttons. One button enables the user to communicate exclusively with other users, and the other button enables the user to communicate with the customer. The principal disadvantage is that the system requires two distinct radio frequencies to operate in a duplex mode. The second disadvantage of the conventional two-way radio frequency communication system is the interference caused by other nearby radio communication devices, and by the existing electrical system, such as lighting and power systems. Another disadvantage is the burdensome licensing requirement from the Federal Communications Commission.

Therefore, it would be highly desirable to have a new and improved communication system which reduces substantially, if not eliminates totally, the interference with the surrounding power and radio systems and the two frequency requirement. The communication system should be available for use without any licensing requirement from the Federal Communications Commission.

Several solutions have been attempted in the field to overcome the foregoing problems associated with the use of the radio frequency communications systems. For instance, the U.S. Pat. Nos. 2,404,696, 2,421,468, 2,494,645, 2,599,368, 3,501,640, and 4,229,829, describe various optical communication systems to replace the conventional radio systems. Such optical communication systems may be suitable for use in particular applications, since optical systems do not require government licensing due to the fact that no electrical interference is created by the use of such systems. However, none of the prior known optical communication systems have been entirely satisfactorily adapted for use in fast food restaurants or for relatively inexpensive short range two-way communication systems in general.

The conventional optical atmospheric transmission systems generally utilize a 95 KHz subcarrier frequency which is modulated by the audio signals. The subcarrier frequency then amplitude modulates the optical emitters. The conventional duplex optical transmission systems generally utilize two different operating optical frequencies of the modulated light beam, in an attempt to prevent interference between the transmitted and the received modulated light beams.

The use of dual operating optical frequencies requires relatively expensive components, such as emitters and receptors, and therefore increases the cost of the communication system. In this regard, the modulation of the beams over long wavelength carriers requires a sufficient spacing between the emitters and the receptors for minimizing the interference therebetween. However, the optical system is rendered relatively bulky, expensive and impractical to carry when two different frequencies are utilized.

At the present state of the art, long wavelength optical components (emitters and receptors) are very expensive and not conducive to be used in a lightweight economically priced system. High-Q filters have been utilized to discriminate and to reduce the interference between the transmitted and the received signals. However, the problems associated with the use of high-Q filters reduces the transmission efficiency and render such solution unduly costly. In this respect, the high-Q filters are not only relatively expensive, but they are also generally sensitive to the input voltage and to the ambient temperature. Thus, the conventional communication systems utilizing high-Q filters require frequency stabilization circuits for the transmitted signals, thereby adding unnecessarily to the cost of manufacture of the system.

Therefore, it would be highly desirable to have a new and improved relatively inexpensive to manufacture, short range communication system, which can be used for commercial establishments, such as for use in fast food restaurants. The communication system should be a full duplex system which avoids the foregoing licensing problems associated with the prior known radio frequency systems. The portable duplex communication system, should be relatively stable and inexpensive to produce, to operate and to maintain.

The conventional optical communication systems have a relatively poor transmission efficiency, and thus a higher power requirement is necessitated to compensate for the signal to noise ratio. Such high power consumption causes the power source, such as a battery, to be drained prematurely.

Therefore, it would be highly desirable to have a new and improved communication system which has a relatively high transmission efficiency, and a low power consumption, for preventing rapid drainage of the power source.

Another problem associated with the conventional optical systems is the increased loss of sensitivity, at the base station, as well as at the remote stations, which is caused primarily by leakage of the optical signals from the emitter to the adjacent receptor. Such leakage interferes with the proper reception and recognition of the signals and affects adversely the sensitivity of the communication system. An attempted solution to resolve such leakage problem is disclosed in U.S. Pat. No.

2,404,696, whereby an opaque light shield is disposed between the transmitter and the receptor of the communication device.

Such solution has proven to be clearly less than totally satisfactory for use in fast food restaurants, where portable remote stations are transported constantly by the operators. In this regard, the recommended communication device requires the alignment of the stations, so as to prevent the interposed shield from interfering with the light propagation path. However, it is not practically feasible to maintain continuously a straight radiation path between the stations, particularly in an intercom system for use in fast food restaurants, or other business establishments, such as business offices, where movement of personnel is required or otherwise important to the proper functioning of the business.

Therefore, it would be highly desirable to have a new and improved communication system which has minimal sensitivity loss, and which reduces substantially, if not eliminates completely, the leakage between the transmitters and the receptors of the base station and the remote units. The communication system should be amenable to continuous transportation by the users.

DISCLOSURE OF INVENTION

Therefore, it is an object of the present invention to provide a new and improved wireless, optical short-range communication system, which is relatively inexpensive to manufacture, and which is light in weight and portable.

It is another object of the present invention to provide such a new and improved full duplex wireless optical communication system, which is adapted to be used in fast food restaurants, or such other commercial institutions.

Briefly, the above and further objects and features of the present invention are realized by providing a wireless optical short-range communication system adapted for use as an intercom system. The system can be used in fast food restaurants and similar commercial institutions.

The communication system includes a base station for interconnecting in optical communication a group of substantially similar physically spaced-apart, remote units. Each one of the remote units includes an emitter for transmitting an optical message-carrying beam to the base station, and a receptor for receiving an optical message-carrying beam from the base station. The base station includes a receptor for receiving the optical beam transmitted by the emitters of all of the remote units, and an emitter for relaying the received optical beam to the receptors of all the remote units.

The base station includes a clock arrangement for synchronizing the operation of the system 10 in a time division multiplexing carrier arrangement, by providing individual discrete time slots for the transmission of the signals from the remote units to the base unit, and for the transmission of the signals from the base unit to the remote units. In this regard, the base station and each one of the remote units include an oscillator for modulating the audio frequency on a predetermined subcarrier frequency, and another oscillator for modulating the subcarrier frequency on a predetermined optical infrared carrier frequency.

Therefore, by using time division multiplexing techniques only a single optical carrier frequency is required to complete a duplex communication path. While the main carrier operates continuously, dual carrier frequencies may be used for duplex operation. The main carrier is "on" only during its assigned time slot, thereby making duplex operation possible with only one carrier frequency. The use of a single optical carrier frequency reduces the cost of optical communication system, by reducing the number of required circuits. The reduced number of components decreases substantially the premature drainage of the power source, by reducing the power consumption of the communication system. Furthermore, the reduced number of components facilitates the portability of the system by reducing its overall size and weight.

The deactivation of the emitters during the reception of signals, and the deactivation of the receptors during the transmission of signals, reduce substantially, if not eliminate totally, the undesirable leakage of signals between the receptor and emitter of the individual remote unit or base station. Furthermore, the use of the optical infrared frequency rather than the radio frequencies, reduces substantially any undesirable interference with surrounding power and radio systems. Thus, the transmission efficiency of the communication system is improved greatly. Additionally, the optical frequency enables the system to be used without any licensing requirement from the Federal Communications Commission or from any other governmental agency.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
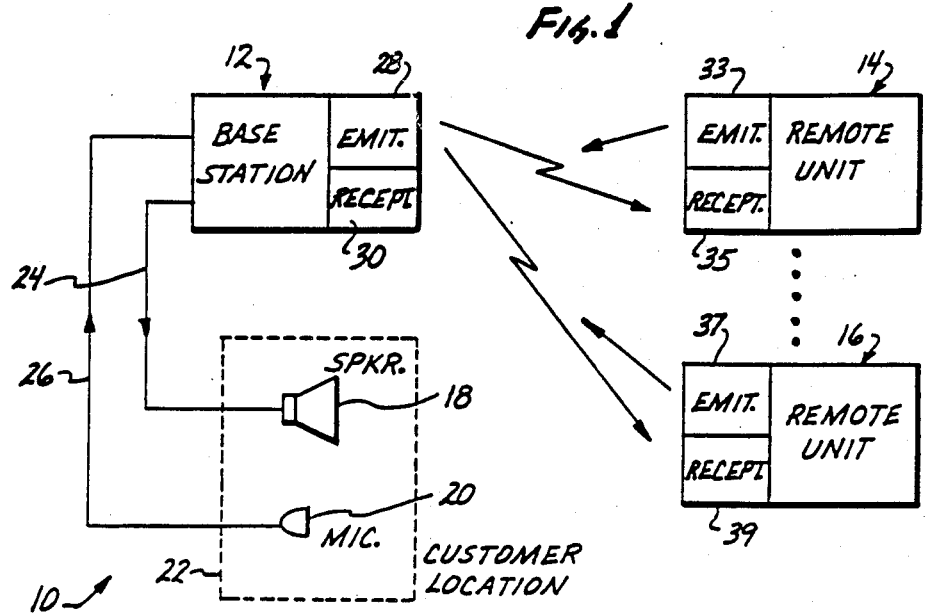
FIG. 1 is a block diagram of a wireless optical communication system, which is constructed in accordance with the present invention, and which shows a base station transmitting signal to remote stations, and receiving signals therefrom.

Referring to the drawings and more particularly to FIG. 1 thereof, there is illustrated a full-duplex wireless optical short-range communication system 10, which is constructed in accordance with the present invention, and which is adapted for use as an intercom system. Thus, the system 10 can be used in commercial establishments, such as fast food restaurants or similar institutions.

The system 10 generally includes one base station or unit 12, for interconnecting in optical communication a group of similar remote units or stations, such as the remote units 14 and 16. While only two remote units 14 and 16 are shown for illustration purposes, it will become clear to those skilled in the art that many more remote units may also be used.

A speaker 18 and a microphone 20 are disposed at a remote customer location 22, and are connected to the base station 12 by respective electrical cables 24 and 26.

The base station 12 includes an emitter 28 and a receptor 30, for communicating with the remote units, such as the remote units 14 and 16. In this regard, each one of the remote units includes an emitter and a receptor. For instance, the remote unit 14 includes an emitter 33 and a receptor 35, and the remote unit 16 includes an emitter 37 and a receptor 39.

Figure 4:
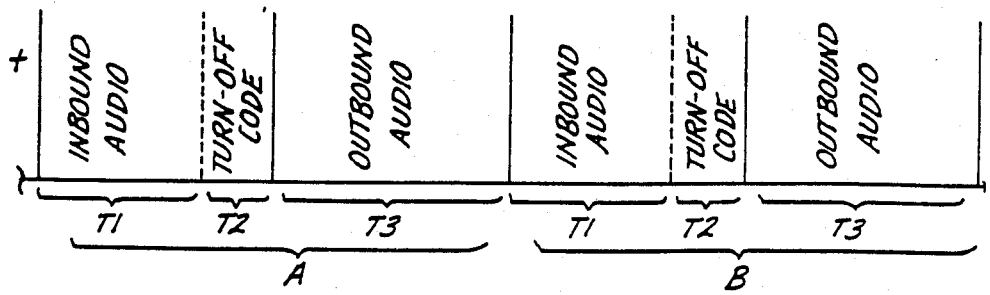
FIG. 4 is a timing diagram for the system of FIG. 1, illustrating a sequence of two time division multiplexed channels, each one of which being allotted a discrete time slot within a sampling frame.

Considering now the operation of the system 10 with reference to FIGS. 1 and 4, the system 10 utilizes a single optical carrier frequency for establishing a full duplex communication link between the base station 12 and all of the remote units such as the remote units 14 and 16. The system 10 further utilizes time division multiplexing techniques for modulating the single optical carrier frequency. However, it will become apparent to those skilled in the art that a single communication channel can be dedicated to each individual remote unit, and to the remote customer location, whereby each channel is allotted a discrete time slot within a sampling frame.

The sampling rate utilized by the present time division multiplexing techniques is determined by information theory techniques, to optimize the time division multiplexing process. It has been found that the preferred sampling rate is twice the highest baseband frequency times the number of desired independent channels.

The time slot A generally includes an INBOUND AUDIO phase T1, during which the remote unit 14 transmits optical infrared message-indicative signals from its emitter 33, to the receptor 30 of the base station 12. During the INBOUND AUDIO phase T1, the receptor 35 of the remote unit 14 is deactivated, so as to prevent leakage of signals between the emitter 33 and the receptor 35. Similarly, during the phase T1, the receptors of all the remaining remote units, such as the receptor 39 of the remote unit 16, are deactivated. Furthermore, during the INBOUND AUDIO phase T1, the emitter 28 of the base station 12 is deactivated.

The time slot A further includes a subsequent TURN-OFF phase T2, which indicates the completion of the INBOUND AUDIO phase T1, during which time a TURN-OFF code is transmitted from the base station 12 to the remote unit 14 to indicate that message transmission time is terminated.

An OUTBOUND AUDIO phase T3 immediately succeeds the TURN-OFF phase T2. During the phase T3, the base station emitter 28 is caused to be activated to enable the base station 12 to communicate with the remote units. The receptor 30 of the base station 12 is deactivated during phase T3, in order to prevent leakage of signals from the emitter 28.

Thus, during the OUTBOUND AUDIO phase T3, the message which was previously transmitted from the remote unit 14 to the base station 12, can be transmitted by the emitter 28 to the receptors of all the remote units, such as the receptor 39 of the remote unit 16. Thus, in the preferred form of the present invention used in fast food restaurants, during T3, all of the remote units receive the messages simultaneously, as repeated by the base station, originally received from either the customer location or from one of the remote units. Furthermore, the emitters of all the remote units, such the emitters 33 and 37 are deactivated, in order to avoid undesirable leakage or transmission of messages.

The foregoing sequence of INBOUND AUDIO phase T1, TURN-OFF phase T2 and OUTBOUND phase T3 is recurrent and periodic.

Figure 3:
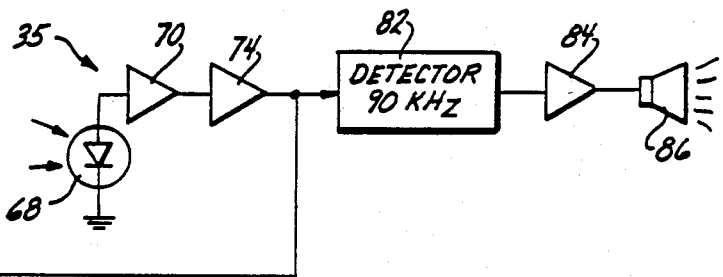
FIG. 3 is a symbolic block diagram of one of the remote units of FIG. 1.
Figure 3:
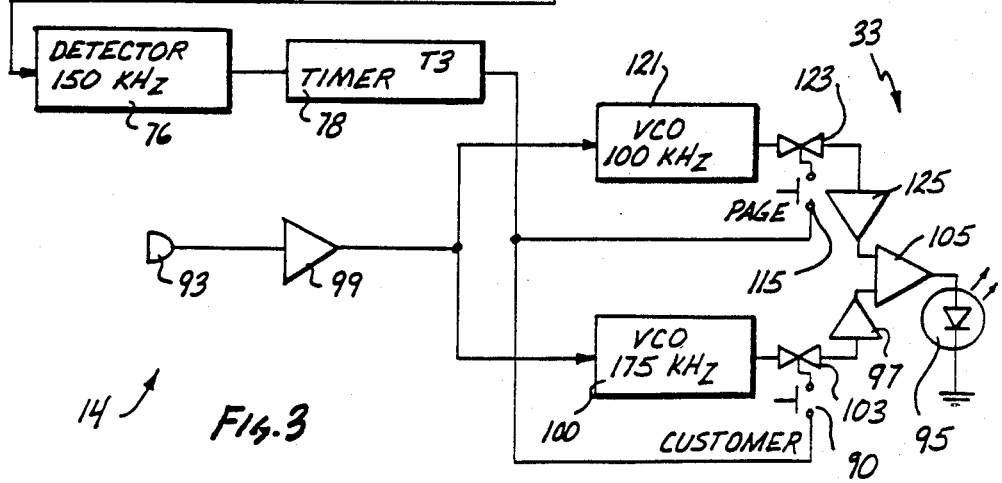
Figure 2:
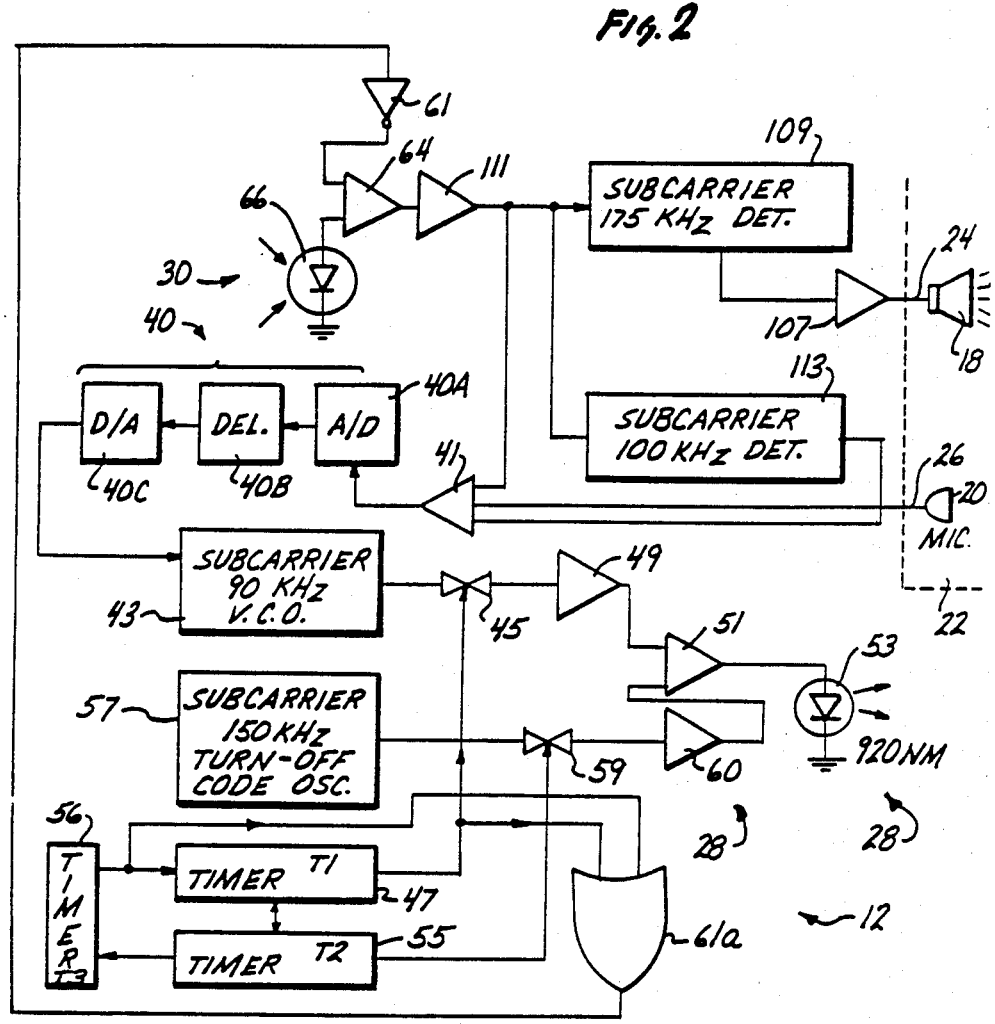
FIG. 2 is a block diagram of the base station of FIG. 1.

Considering now the communication path between the customer location 22 and the remote units, such as the remote units 14 and 16, in greater detail with respect to FIGS. 2 and 3, the customer places the order or message verbally via the microphone 20. The audio message is communicated electrically to the base station 12 over the cable 26, where it is modulated and optically transmitted to all the remote units. The remote units, such as the remote units 14 and 16, are generally identical to one another, and therefore only the unit 14 will be described hereinafter in greater detail with reference to FIG. 3. The optical message is detected by the remote unit 14, where it is demodulated into an audio signal.

As illustrated in FIG. 2, and for the purpose of establishing the foregoing communication path between the customer location and the remote units, the base station 12 includes a summing amplifier 41 to amplify the incoming voice signal from the microphone 20. A delay circuit generally indicated at 40 causes the transmission of the incoming voice signal to be delayed, for retransmission by the base station 12 during the OUTBOUND AUDIO phase T3. A voltage controlled subcarrier oscillator 43 with a frequency of 90 KHz is modulated by the amplified and delayed voice signal.

A master clock or timer 47 controls the output of the voltage controlled oscillator 43 via a transmission or logic gate 45, for synchronizing the transmission of the modulated signal. Thus, the modulated signal is allowed to be transmitted, only when the timer 56 is set. In this regard, the timer 56 would only be set during the OUTBOUND AUDIO phase T3 of a time slot, such as during the time slots A and B, as shown in FIG. 4.

An amplifier 49 is connected to the output of the transmission gate 45. An input of a summing amplifier and modulator 51 is connected to the output of the amplifier 49, to modulate the infrared frequency of the output signal via a light emitting diode 53 which transmits to all remote units.

A TURN-OFF code oscillator 57 generates a 150 KHz subcarrier frequency, for controlling the transmission of the modulated signal at the output of the amplifier 49. In this respect, a timer or clock 55 is synchronized to the master clock 47, and has its output connected to a transmission or logic gate 59, for controlling the output of the oscillator 57. The timer 55 blocks the TURN-OFF signal at the output of the oscillator 57 during the INBOUND AUDIO phase T1 and the OUTBOUND AUDIO phase T3, and enables the transmission of the TURN-OFF signal only during the TURN-OFF phase T2.

The subcarrier frequency at the output of the transmission gate 59 is passed through an amplifier 60. The cut-off signal is then fed to another input of the summing amplifier and modulator 51 to modulate the light emitting diode 53. It will become apparent to those skilled in the art that the 150 KHz subcarrier frequency can be modulated with data.

For the purpose of causing the receptor 66 of the base station 12 to be deactivated during the TURN-OFF and OUTBOUND AUDIO phases T2 and T3 respectively, the signals from the outputs of the timers 47 and 55 are fed through an inverter gate 61 via a gate 61A to the input of a summing amplifier 64, to interrupt the transmission of any signal detected by a light detecting or receiving diode 66, received from a remote unit or from the customer location.

Thus, when the light emitting diode 53 is emitting an optical signal during the phases T2 and T3, the signal which might leak therefrom to the light receiving diode 66 is prevented from further propagation by the summing amplifier 64. Hence, the noise level of the modulated signal is reduced substantially, since any signal leaks from the emitter 28 to the receptor 30 are attenuated considerably, if not eliminated totally.

The signal radiated or emitted by the light emitting diode 28 (FIG. 1) is received by the receptors of all the remote units, such as the receptor 35 of the unit 14.

Considering now the remote unit 14 with reference to FIG. 3, the message-carrying optical carrier signal impinges on a light detecting or receiving diode 68, and it is amplified by an amplifier 70. The amplified signal is demodulated by a demodulator 74, which has its input connected to the output of the amplifier 70. A 90 KHz detector 82 is connected to the output of the demodulator 74 to detect the 90 KHz carrier frequency.

Thus, only the signals having a sub-carrier frequency of 90 KHz are passed through the detector 82 and are subsequently fed to an amplifier 84. The amplified signal at the output of the amplifier 84 then drives the speaker 86. The same message is communicated in a similar manner to all the other users, over their respective remote units, such as the remote unit 16 in FIG. 1.

A 150 KHz detector 76 has its input connected to the output of the demodulator 74. A timer 78 has its input connected to the output of the detector 76, such that when the detector 76 detects a 150 KHz subcarrier frequency, generated by the base station oscillator 57 in FIG. 2 during the TURN-OFF phase T2, it triggers the timer 78 to generate a cut-off signal at the output thereof. The cut-off prevents the emitter of the remote station from being activated, as it will be described later in greater detail.

Considering now the communication path between the remote units such as the remote unit 14, and the remote customer location 22, with reference to FIGS. 1 and 3, the user of the remote unit 14 initiates the communication by pressing and closing a switch 90, to connect the control signal at the output of the timer 78 to the control input of a transmission gate 103.

After initiating the communication, the user places a message over a microphone 93. The microphone output is then amplified by an amplifier 99. The input of a voltage controlled oscillator 100 is connected to the output of the amplifier 99, to cause the amplified voice signals to modulate a subcarrier frequency of 175 KHz.

The transmission gate 103 is connected to the output of the oscillator 100, and its conduction is controlled by the control signal at the output of the timer 78. Thus, the modulated signal at the output of the oscillator 100, can be transmitted over the remote unit emitter 33 only during the INBOUND AUDIO phase T1, when the timer 78 is deactivated. The operation timer 78 is synchronized with the timer 56 of the base unit 12 (FIG. 2).

An amplifier 97 is connected to the output of the transmission gate 103. A summing amplifier and modulator 105 is connected to the output of the amplifier 97, to modulate the light emitting diode 95.

The message-carrying optical signals are transmitted to the receptors of all the remote units, such as the receptor 39 of the remote unit 16. Furthermore, even though such signals partially might leak to the receptor 35 of the remote unit 14, the signals transmitted to the receptors of the remote units, and the signals leaking to the receptor 35, are not detected by the remote units, including the remote unit 14, in that such remote units do not include circuits for detecting signals modulated at a subcarrier frequency of 175 KHz. Thus, while the signals are received by the receptors of the remote units, such as the receptors 35 and 39 of the remote units 14 and 16 respectively, they are not recognized thereby, and do not cause a substantial interference with the transmitted messages.

As illustrated in FIG. 2, the message-carrying (175 KHz subcarrier) signals that are transmitted by the remote unit 14, during the INBOUND AUDIO phase T1, are received by the light detecting diode 66 of the base unit 12.

During the INBOUND AUDIO phase T1, the timer 55 inhibits the modulating signal at the output of the oscillator 57. The timers 55 and 56, which are connected to gate 61A cause the gate 61A to generate a signal to drive the inverter gate 61. Inverter gate 61 in turn, generates an enabling signal, during phase T1 which is connected to one input of the summing amplifier 64. Similarly, the output of the light detecting diode 66 provides an enabling signal at the other input of the summing amplifier 64, when the light detecting diode 66 receives an input signal. Thus, during the INBOUND AUDIO phase T1, the receptor 66 is active and emitter 53 is inactive.

A demodulator 111 is connected to the output of the summing amplifier 64, to demodulate the incoming signal. The output of the demodulator 111 is connected simultaneously to two subcarrier detectors 109 and 113, and to the voltage controlled oscillator 43 through the summing amplifier 41 and the delay circuit 40. The input (175 KHz subcarrier) signals are recognized by the detector 109 and are fed to a speaker 18 at the remote location 22 in FIG. 1, through an amplifier 107. The detector 113, does not recognize the incoming signals since they are modulated at a 175 KHz subcarrier frequency rather than at a 100 KHz subcarrier frequency. Therefore, the detector 113 prevents the summing amplifier 41 from passing the 175 KHz sub-carrier frequency thereby inhibiting the passage of the incoming frequencies to the emitter 28.

Considering now the paging feature between the remote units, such as the remote units 14 and 16, with reference to FIGS. 2 and 3, the remote unit user initiates the communication by pressing and closing a page switch 115, to connect the control signal at the output of the timer 78 to the control input of a transmission gate 123. A voltage controlled oscillator 121 is connected to the microphone 93 through the amplifier 99, to modulate the subcarrier frequency of 100 KHz.

The transmission gate 123 is connected simultaneously to the output the oscillator 121, to control the transmission of the modulated signal over the emitter 95. Thus, the modulated signal at the output of the oscillator 121 can be transmitted only during the INBOUND AUDIO phase T1, when the timer 78 is activated.

An amplifier 125 is connected to the output of the transmission gate 123, and feeds the summing amplifier/modulator 105. The signal at the output of the summing amplifier and modulator 105 modulates the light emitting diode 95 for transmission to all the remote units through the base unit 12.

As illustrated in FIG. 2 the optical message-carrying signals that are transmitted by the remote unit 14, are recognized by the receptor 66 of the base unit 12. The incoming signals are received by the light detecting diode 66 and are fed to the 100 KHz detector 113 through the summing amplifier 64 and the demodulator 111, as previously described with respect to the remote unit/customer communication path.

The audio signal at the output of the detector 113 is fed to the summing amplifier 41 and then to the delay circuit 40. In this respect, one form of the delay circuit 40 includes an analog to digital converter 40A that is connected to the output of the amplifier 41. A delay device 40B is connected to the output of the analog-to-digital converter 40A and to the input of a digital-to-analog converter 40C. The digital-to-analog converter 40C is connected to the input of a voltage controlled oscillator 43, to modulate a 90 KHz subcarrier frequency. While one form of the delay circuit 40 has been described, it will become apparent to those skilled in the art that other digital or analog delay circuits can be used. The modulated signal is then transmitted over the optical emitter 53, in a manner that is similar to that previously described in connection with the voice signals placed over the microphone 20 at the customer location 22.

Referring now to FIG. 1, the transmitted message-carrying signals are received and recognized by the receptors of all the remote units, such as the receptor 39 of the remote unit 16, in a similar manner as described above in connection with the signals modulated at the 90 KHz subcarrier frequency.

While a time division multiplexing technique has been described, it will become apparent to those skilled in the art after reviewing the foregoing disclosure that pulse code modulation or random access techniques can be used. It should also be understood that while the system 10 has been described in connection with fast food restaurants, other possible applications will become apparent after reviewing the foregoing specification.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

What is claimed is:

1. A wireless optical short range communication system utilizing a single optical carrier frequency comprising:
   a base station;
   a plurality of substantially similar spaced-apart remote units interconnected in optical communication with said base station;
   each one of said remote units including an optical emitter for transmitting an optical message-carrying beam at a predetermined optical carrier frequency to said base station;
   each one of said remote units further including an optical receptor for receiving an optical message-carrying beam from said base station;
   said base station including an optical receptor for receiving the optical message-carrying beam transmitted by the optical emitter of any of said remote units;
   said base station further including an optical emitter for repeating the message content of said optical message-carrying beam received from any one of said remote units to all of said remote units at said predetermined optical carrier frequency;
   clock means for generating recurring time slot signals, said signals including inbound signals and outbound signals; and
   said base station and said remote units including means responsive to said inbound and outbound signals for causing said station and said units to send and receive said beams during individual time slot signals.

2. A wireless optical communication system as defined in claim 1, further including a speaker and a microphone disposed physically at a remote location, and connected electrically to said base station.

3. A wireless optical communication system as defined in claim 2, wherein said base station includes first means to modulate audio signals fed through said remote microphone, at a first predetermined subcarrier frequency.

4. A wireless optical communication system as defined in claim 3, wherein said base station further includes second means to modulate said first predetermined subcarrier frequency at an optical carrier frequency.

5. A wireless optical communication system as defined in claim 4, wherein each one of said remote units includes means to demodulate said optical carrier frequency.

6. A wireless optical communication system as defined in claim 5, wherein each one of said remote units further includes first means to detect said first predetermined subcarrier frequency.

7. A wireless optical communication system as defined in claim 6, wherein each one of said remote units includes first means for modulating audio signals, at a second predetermined subcarrier frequency.

8. A wireless optical communication system as defined in claim 7, wherein each one of said remote units includes second means for modulating audio signals, at a third pre-determined subcarrier frequency.

9. A wireless optical communication system as defined in claim 8, wherein said remote units further include third means to modulate said second and third predetermined sub-carrier frequencies at an optical carrier frequency.

10. A wireless optical communication system as defined in claim 7, wherein said base station includes means for detecting said second sub-carrier frequency.

11. A wireless optical communication system as defined in claim 10, wherein said base station includes means for detecting said third sub-carrier frequencies.

12. A wireless optical communication system as defined in claim 1, wherein said base station includes clock means for synchronizing the operation of said remote units in a time division multiplexing manner.

13. A wireless optical communication system as defined in claim 12, wherein said clock means includes a first timer to enable the emitter of said base station during an OUTBOUND AUDIO phase.

14. A wireless optical communication system as defined in claim 13, wherein said clock means includes a second timer to generate a TURN-OFF signal.

15. A wireless optical communication system as defined in claim 1, wherein each one of said remote units includes first means for modulating audio signals at a first predetermined sub-carrier frequency.

16. A wireless optical communication system as defined in claim 15, wherein each one of said remote units includes second means for modulating audio signals at a second predetermined sub-carrier frequency.

17. A wireless optical communication system as defined in claim 16, wherein said remote units include means for modulating said first predetermined sub-carrier frequency and said second predetermined sub-carrier frequency at an optical carrier frequency.

18. A wireless optical communication system as defined in claim 17, wherein said base station includes means to demodulate at said optical carrier frequency.

19. A wireless optical communication system as defined in claim 18 wherein said base station includes means to detect said first predetermined sub-carrier frequency.

20. A wireless optical communication system as defined in claim 19 wherein said base station includes means to detect said second predetermined sub-carrier frequency.

21. A wireless optical communication system as defined in claim 20 wherein said base station includes first means responsive to said first and second detecting means for modulating any detected predetermined sub-carrier frequency at a third predetermined sub-carrier frequency.

22. A wireless optical communication system as defined in claim 21 wherein said base station includes second means for modulating said third predetermined sub-carrier frequency at an optical carrier frequency.

23. A wireless optical communication system as defined in claim 1, wherein said base station includes means to demodulate at said optical carrier frequency transmitted by said remote units.

24. A wireless optical communication system as defined in claim 1, wherein said optical message carrying beam transmitted by said base station and said optical message carrying beam transmitted by each of said remote units, is transmitted at a single optical carrier frequency.

25. A wireless optical communication system as defined in claim 1, wherein said base station includes means to detect the message content of the optical message carrying beam transmitted by said remote unit emitters; and means responsive to said detecting means for repeating and transmitting said message content to said remote units.

26. A wireless optical communication system as defined in claim 1, wherein said optical emitters and receptors of each of said remote units and said base station are operable simultaneously in a full-duplex mode.

27. A wireless optical communication system as defined in claim 26 wherein said single optical carrier frequency is an infrared radiation carrier transmission.

28. A wireless optical communication system as defined in claim 27 wherein said single optical carrier frequency is a time-division multiplexed optical signal.

29. A wireless optical short range communication system comprising:
    a base station;
    a plurality of substantially similar spaced-apart remote units interconnected in optical communication with said base station;
    each one of said remote units including an optical emitter for transmitting an optical message-carrying beam to said base station;
    each one of said remote units further including an optical receptor for receiving an optical message-carrying beam from said base station;
    said base station including an optical receptor for receiving the optical beam transmitted by the optical emitter of any one of said remote units;
    said base station further including an optical emitter for repeating the message content of said optical message-carrying beam received from any one of said remote units to all of said remote units;
    clock means for synchronizing the operation of said remote units in a time division multiplexing manner;
    said clock means including a first timer to enable the emitter of said base station during an OUTBOUND AUDIO phase;
    said clock means further including a second timer to generate a TURN-OFF signal; and
    each one of said remote stations including means responsive to said TURN-OFF signals to deactivate the emitter of said remote station for a predetermined time.

30. A wireless optical communication system as defined in claim 29, wherein said means to deactivate the emitter of said remote station includes a detector and a timer.

* * * * *